Sept. 10, 1968 R. P. OFFEREINS 3,401,330
SYNCHRO TRANSFORMER NETWORK FOR DERIVING AN AC
VOLTAGE THAT LINEARLY VARIES IN PHASE AS
A FUNCTION OF ROTOR POSITION
Filed March 11, 1966
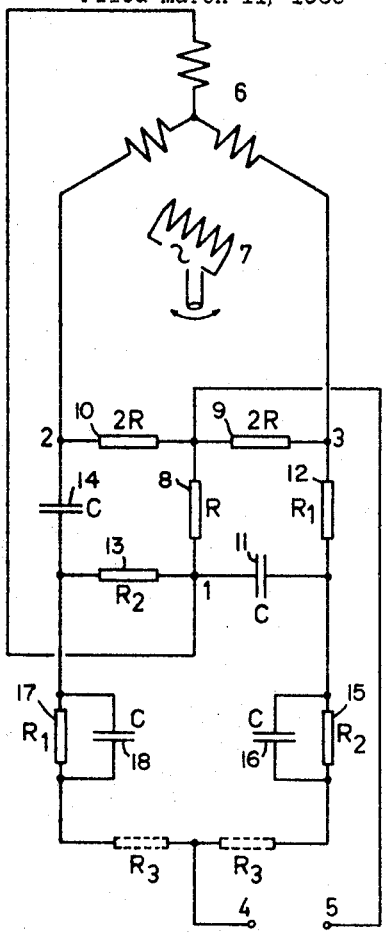
INVENTOR
RIENK P. OFFEREINS
BY
AGENT United States Patent Office 3,401,330
Patented Sept. 10, 1968

3,401,330
SYNCHRO TRANSFORMER NETWORK FOR DE-
RIVING AN AC VOLTAGE THAT LINEARLY
VARIES IN PHASE AS A FUNCTION OF ROTOR
POSITION
Rienk Pieter Offereins, Hengelo, Overijssel, Netherlands,
assignor to N.V. Hollandse Signaalapparaten, Hengelo,
Overijssel, Netherlands, a firm of the Netherlands
Filed Mar. 11, 1966, Ser. No. 533,578
Claims priority, application Netherlands, Mar. 16, 1965,
6503288
5 Claims. (Cl. 323—109)

ABSTRACT OF THE DISCLOSURE

A synchro transformer network for deriving at first and second output terminals an AC voltage that linearly varies in phase as a function of the rotor position. The network includes three Y-connected resistors across the sychro terminals and first and second series connected R-C circuits connected between the first and third and first and second synchro terminals, respectively. One output terminal is connected to the junction of the Y-connected resistors and the other output terminal is connected to junction points of said first and second series R-C circuits via first and second parallel-connected R-C circuits. The various network components are chosen in a particular manner as that the AC output voltage is substantially independent of the frequency of the energizing source.

This invention relates to a network that derives an alternating voltage, the phase angle of which is substantially a linear function of the position of the movable part of a synchronous transformer. This voltage is derived from the voltages supplied by the three-phase winding of the transformer when its rotor winding is supplied from a single phase alternating voltage source.

Networks of this type are well known in the art. They are used in arrangements for establishing the position of an object in which this position is converted into a phase-angle in order to permit the conversion of the mechanical value into an electrical one. The known networks have the disadvantage that the phase angle not only depends on the position of the synchronous transformer but is also relatively strongly influenced by the frequency of the alternating voltage feeding the synchronous transformer. As a result, changes in the supply frequency cause measuring errors. For this reason it is desirable for this frequency to remain absolutely constant, and this requires an expensive and complicated voltage source.

It is an object of the present invention to obviate substantially this disadvantage of the known networks of the type described above, and to procure a network of this type the operation of which is no more than very slightly dependent on the frequency of the monophase supply voltage for the synchronous transformer. According to the invention the network is built in such a way that the first one of its two output terminals is connected by way of a resistance with the value R to the first one of the three terminals of the three-phase stator winding of the synchronous transformer. This output terminal also is connected by means of separate circuits each having a resistance with the value 2R, to the second and third terminals of said three-phase winding. The first terminal of the three-phase winding is on the one hand connected by way of a capacitor with the capacitance value C to one end of a resistance with the value $R_1$. The other end of this resistance is connected to said third terminal of the three-phase winding. The first terminal of the stator also is connected by way of a resistance with the value $R_2$ to one terminal of a capacitor with the value C, the other terminal of which is connected to said second terminal of the three-phase winding. Moreover, the second output terminal of the network is connected by means of a capacitor with the value C, that is shunted by a resistance with the value $R_1$, to a point between the capacitor and the resistance in the circuit directly connecting the first and second terminals of the three-phase windings. The second output terminal also is connected by means of another capacitor with the value C, that is shunted by a resistance with the value $R_2$, to a junction point between the capacitor and the resistance in the circuit directly connecting the first and third terminals of the three-phase winding. The values of the resistances and capacitances are chosen to satisfy the equations:

$$R_1 C = \frac{\sqrt{3}}{2\pi f} \quad R_2 C = \frac{1/3\sqrt{3}}{2\pi f}$$

in which $f$ is the single-phase supply frequency. Preferably the value of the resistance R is small with respect to that of the resistance $R_1$.

In certain embodiments of the network, equal resistances are inserted in both circuits connected to the second output terminal of the network in series with the combination of the capacitor shunted by a resistance. These resistances match the network to its load.

The figure shows an embodiment of a network according to the invention. The upper part of this figure shows a synchronous transformer with a single-phase rotor winding 7 and a three-phase stator winding 6 with the terminals 1, 2 and 3. The single-phase winding is fed by a source of single-phase alternating current (not shown). The network is shown in the lower part of the figure. It is connected to the three terminals 1, 2 and 3 of the three-phase winding. The alternating voltage with the variable phase-angle is supplied by the output terminals 4 and 5 of the network. Three resistors, 8, 9 and 10, are connected in a Y configuration between terminals 1, 2 and 3 of the stator. Resistors 9 and 10 have a resistance value (2R) that is twice the resistance value (R) of resistor 8. A capacitor 11 and a resistor 12 are connected in series between terminals 1 and 3 of the synchro stator. A resistor 13 and a capacitor 14 are connected in series between terminals 1 and 2 of the stator. Resistor 12 has a resistance value $R_1$ and resistor 13 has a resistance value $R_2$.

Output terminal 5 is directly connected to the common junction point of Y-connected resistors 8, 9 and 10. Output terminal 4 is connected by means of two parallel R-C circuits to the junction points between capacitor 11 and resistor 12, and between resistor 13 and capacitor 14. The first parallel R-C circuit includes resistor 15 and capacitor 16, whereas the second parallel R-C circuit includes resistor 17 and capacitor 18. Resistors 15 and 17 have resistance values $R_2$ and $R_1$, respectively, and the capacitors have a capacitance value C. The output voltage produced at terminals 4 and 5 consists of two similar AC waveforms that are combined so as to compensate one another. As a result, the phase angle of the alternating output voltage is substantially constant despite variations in the frequency of the AC supply voltage energizing the rotor 7. The capacitances and resistances satisfy the equations:

$$R_1 C = \frac{\sqrt{3}}{2\pi f} \quad R_2 C = \frac{1/3\sqrt{3}}{2\pi f}$$

($f$ = supply frequency). Preferably the value of the resistance R is small with respect to that of the resistance $R_1$.

Resistances $R_3$ with equal values may be inserted in the two circuits connected to the output terminal 4. They do not impede the correct operation of the network and they may be useful for the purpose of matching the impendance of the network to its load.

Considerations based on network theory show that the network actually supplies an alternating voltage with a phase-angle that is a linear function of the position of the movable part of the synchronous transformer, and that the influence of the supply frequency on this phase-angle is actually negligible within a substantial frequency range because the dependency on frequency is determined by the difference between two similarly shaped curves.

The three-phase winding of the synchronous transformer, shown in the figure in star connection, can also be connected in delta without altering the operation of the network.

What I claim is:

1. A network that derives an alternating voltage from the voltages supplied by the three phase stator windings of a synchronous transformer having a rotor energized from an alternating voltage source, the phase-angle of said alternating voltage being a substantially linear function of the movable rotor, said network comprising first and second output terminals, means connecting the first one of said output terminals by way of a first resistor with the value R to the first one of the three terminals of the three phase winding of the synchronous transformer, means connecting said first output terminal by means of separate circuits each having a resistor with the value 2R to the second and third terminals, respectively, of said three-phase winding, means connecting said first terminal of the three-phase winding by way of a first capacitor with the value C to one end of a second resistor with the value $R_1$, the other end of said second resistor being connected to said third terminal of the three-phase winding, means further connecting said first terminal of the stator winding by way of a third resistor with the value $R_2$ to one terminal of a second capacitor with the value C, the other terminal of said second capacitor being connected to said second terminal of the three-phase winding, means connecting the second output terminal of the network by means of a third capacitor with the value C that is shunted by a fourth resistor with the value $R_1$ to a junction point between the second capacitor and the third resistor, and means connecting said second output terminal by means of a fourth capacitor with the value C, that is shunted by a fifth resistor with the value $R_2$, to a junction point between the first capacitor and the second resistor, the values of resistances and capacitances satisfying the equations:

$$R_1C=\frac{\sqrt{3}}{2\pi f} \quad R_2C=\frac{1/3\sqrt{3}}{2\pi f}$$

in which $f$ is the single-phase supply frequency.

2. Network according to claim 1, wherein the value of the resistance R is small with respect to that of the resistance $R_1$.

3. A network according to claim 1 further comprising sixth and seventh equal resistors individually connected in series between the third and fourth capacitors and the second output terminal of the network.

4. A network for converting the rotational position of a synchro rotor energized by an AC energy source into an alternating voltage having a phase angle that is a linear function of the rotor position, said synchro having a three winding stator and first, second and third terminals, said network comprising first and second output terminals for deriving said alternating voltage, first, second and third resistors, means connecting said first, second and third resistors in a Y-connection between said first, second and third synchro terminals, respectively, said first resistor having a resistance value R and said second and third resistors having a resistance value 2R, means connecting said first output terminal to the junction of said Y-connected resistors, a first capacitor and a fourth resistor connected in series between said first and third synchro terminals, a fifth resistor and a second capacitor connected in series between said first and second synchro terminals, each of said capacitors having a capacitance value C and said fourth and fifth resistors having resistance values $R_1$ and $R_2$, respectively, a third capacitor and a sixth resistor connected in parallel between said second output terminal and the junction point between said fifth resistor and said second capacitor, a fourth capacitor and a seventh resistor connected in parallel between said second output terminal and the junction point between said fourth resistor and said first capacitor, each of said third and fourth capacitors having a capacitance value C and said sixth and seventh resistors having resistance values $R_1$ and $R_2$, respectively, said resistors and capacitors being chosen to satisfy the following expression:

$$R_1C=\frac{\sqrt{3}}{2\pi f} \quad R_2C=\frac{1/3\sqrt{3}}{2\pi f}$$

wherein $f$ is the frequency of the AC energy source.

5. A network as claimed in claim 4 wherein the resistance value R is smaller than the resistance value $R_1$.

References Cited

UNITED STATES PATENTS

| 2,736,851 | 2/1956 | Dutilh | 323—109 X |
| 3,147,473 | 9/1964 | Ujejski | 323—109 X |
| 3,211,993 | 10/1965 | Golden et at. | 323—122 |

FOREIGN PATENTS 650,137    2/1951    Great Britain

MILTON O. HIRSHFIELD, *Primary Examiner.*

W. E. RAY, *Assistant Examiner.*